Feb. 1, 1966  C. F. HIGH  3,232,284
INTERNAL COMBUSTION ENGINE
Filed July 30, 1963  4 Sheets-Sheet 1

INVENTOR.
CARL F. HIGH.
BY Hauke & Hauke
ATTORNEYS

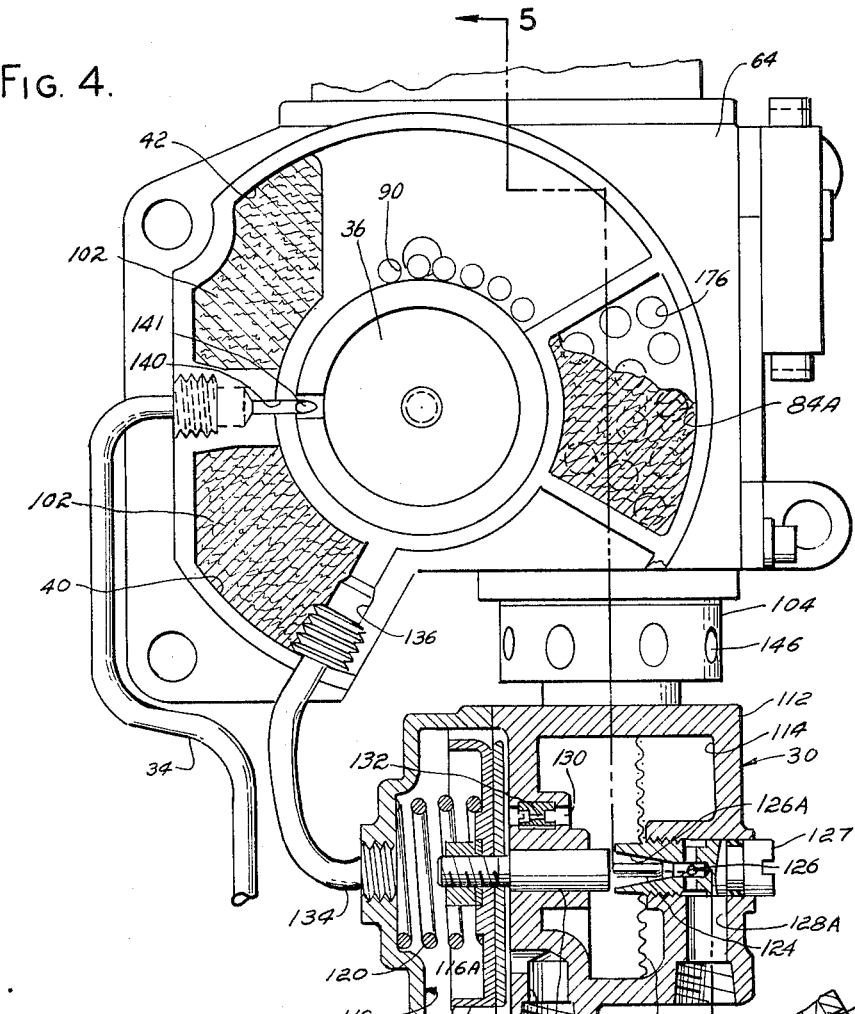
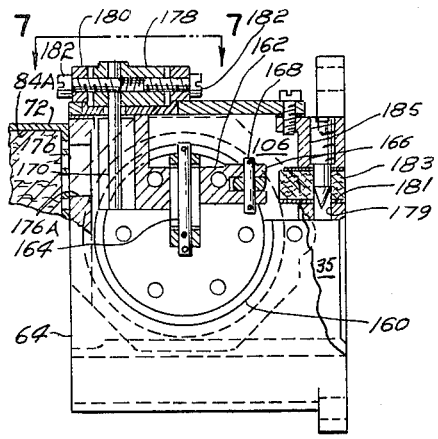
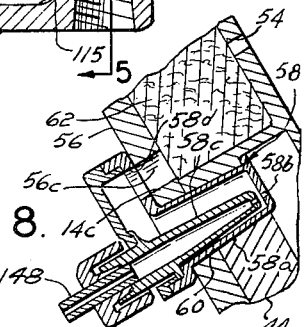

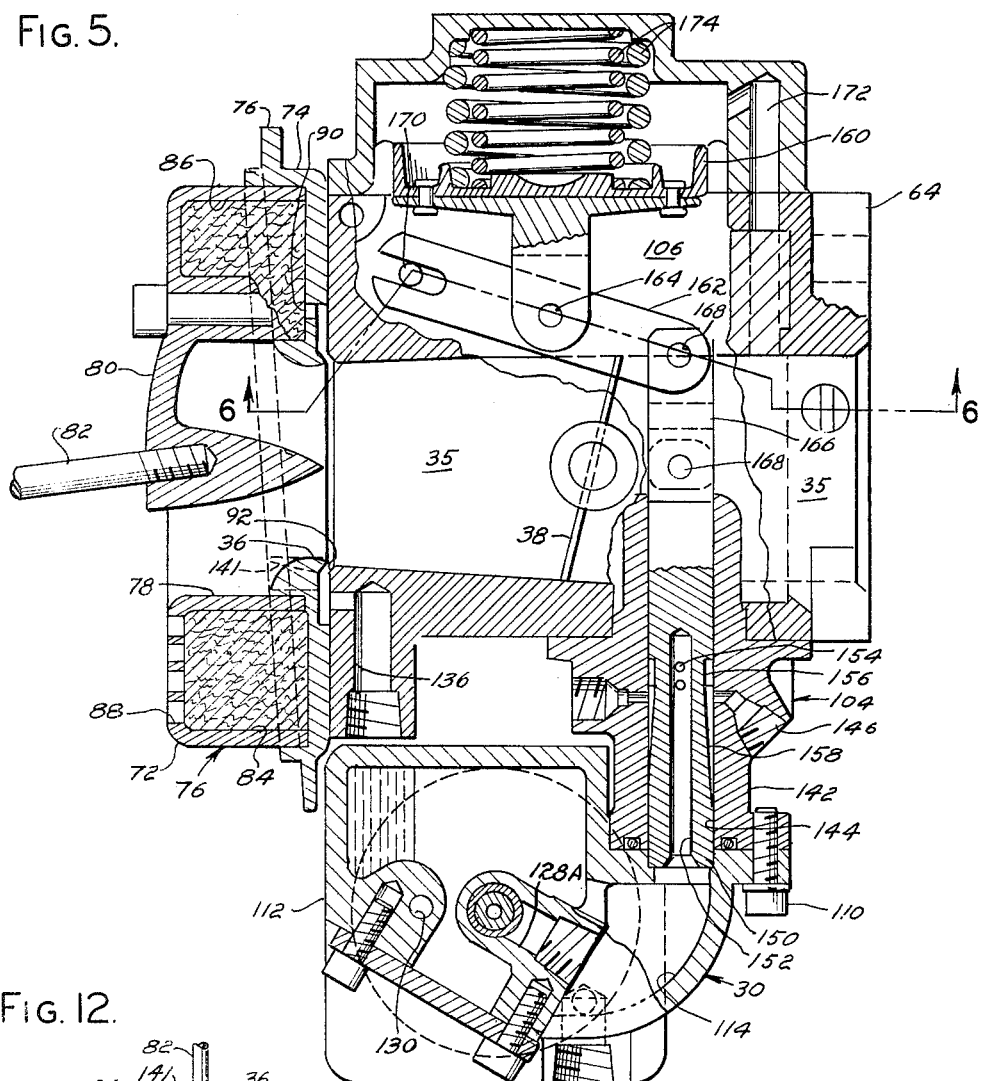

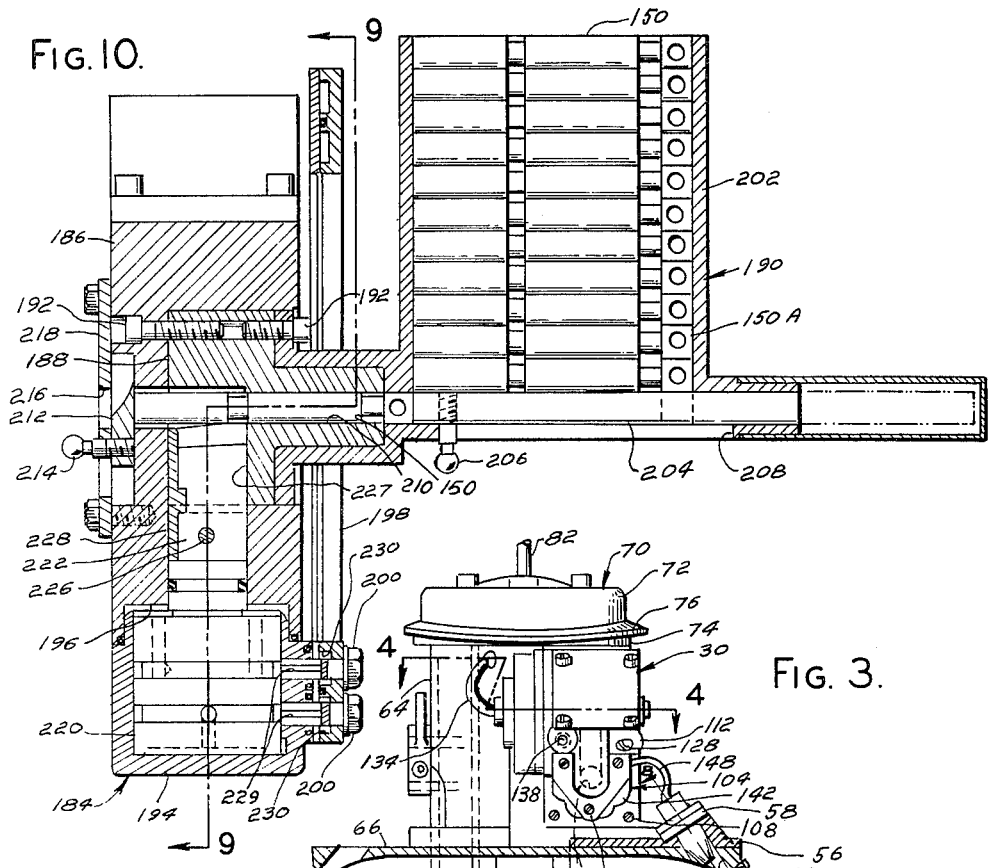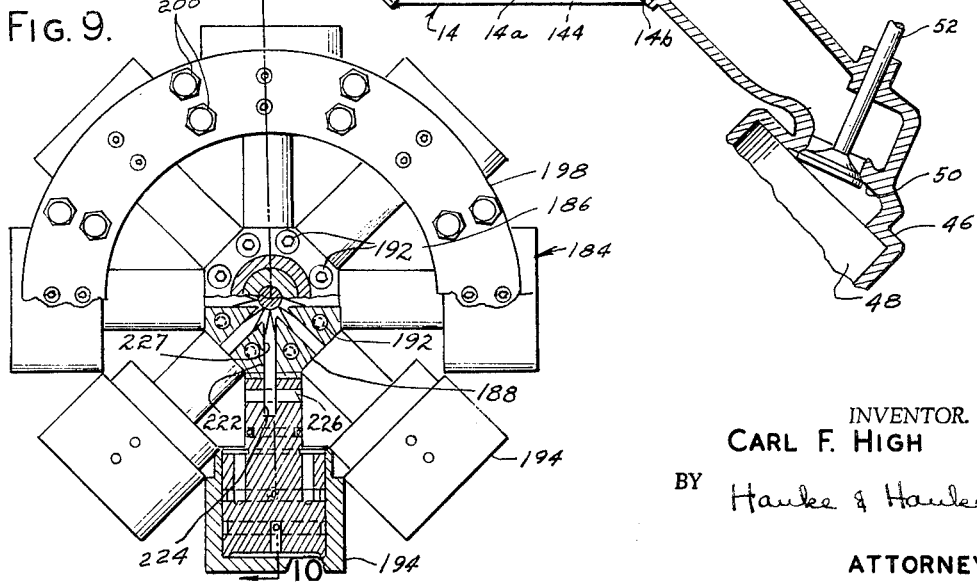

3,232,284
INTERNAL COMBUSTION ENGINE
Carl F. High, 17581 Appoline, Detroit 35, Mich.
Filed July 30, 1963, Ser. No. 298,760
21 Claims. (Cl. 123—119)

My invention relates to internal combustion engines and more particularly to crankcase breather means, fuel metering and pressure regulation, all of which are interrelated to provide a simplified and reliable engine having operational reliability an anti-atmospheric contamination features through improved crankcase ventilation and fuel-air ratio control.

The present engine preferably includes the improved intake port fuel vaporizing system of my copending patent application Ser. No. 167,773, filed on January 22, 1962, now U.S. Patent No. 3,145,699, issued August 25, 1964, but the invention goes further in improving engine combustion characteristics as well as an elimination of contaminating crankcase fumes.

An object of the present invention is to eliminate crankcase fumes by providing improved means circulating filtered air through the crankcase and delivering the air and fumes into the air induction system of the engine.

Another object of the present invention is to reduce atmosphere contamination by internal combustion engines by discharging crankcase fumes into the air induction system through the fuel nozzles.

A further object of the invention is to simplify crankcase ventilation systems of internal combustion engines by providing wholly internal passages rather than external tubing for circulating air through the crankcase and delivering it and contained fumes into the engine air induction system.

Yet another object of the invention is to facilitate delivery of crankcase fumes into the engine air induction system directly through the fuel system by providing internal passages therefor having flame arrester filtering elements therein.

Another object of the invention is to improve such engine operation by providing an idling air adjustment of ample capacity such that sufficient air for engine idling will be fed to the intake manifold to compensate for loss of usable air for idling through the air-sealed nozzle because of the intermixed crankcase fumes.

Still another object of the invention is to eliminate discharge of crankcase fumes into the atmosphere by utilizing components of the fuel delivery and air induction systems for positive discharge of fumes into the engine combustion chambers.

A still further object of the invention is to improve crankcase fume elimination into the combustion chambers of an engine throughout the entire range of operation by providing a venturi in the air induction system operable to withdraw fumes at high speeds and by vacuum-induced flow through the fuel nozzles at low speeds when air flow through the venturi is inadequate.

Yet a further object of the invention is to simplify crankcase ventilation system maintenance, in a system which discharges fumes through flame arresting filter material into the air induction system and fuel nozzles, by providing readily accessible and removable filter holding chambers and/or components.

An additional object of the invention is to improve fuel injection control for internal combustion engines by providing a simplified and reliable fuel metering valve and fuel pressure regulator which corrects air control and fuel pressure regulator which corrects air density responsive fuel delivery for each metering valve position in accordance with mass air flow fluctuations.

A further object of the invention is to facilitate manufacture of engine fuel metering systems by providing a simplified fuel distributing metering valve and improved machinery for its fabrication.

Other objects and advantages of the present invention will be readily apparent to one skilled in the art from the following description having reference to the accompanying drawings which illustrate only one preferred embodiment of the invention, in which like reference characters refer to like parts throughout the several views and in which:

FIG. 3 is a cross-sectional fragmentary view taken substantially on the line 3—3 of FIG. 1.

FIG. 4 is a cross-sectional view taken substantially on the line 4—4 of FIG. 3.

FIG. 5 is a composite cross-sectional view taken substantially on the line 5—5 of FIG. 4.

FIG. 6 is a cross-sectional view taken substantially on the line 6—6 of FIG. 5.

FIG. 7 is a fragmentary view as seen from the line 7—7 of FIG. 6.

FIG. 8 is a cross-sectional view of a preferred fuel nozzle incorporated in the present invention as seen substantially on the line 8—8 of FIG. 3.

FIG. 9 is an end view, partially in section, of a fixture for forming a metering valve of the present invention and taken on the line 9—9 of FIG. 10.

FIG. 10 is a cross-sectional view taken substantially on the line 10—10 of FIG. 9.

FIG. 12 is a cross-sectional view illustrating the air intake and venturi section of FIG. 5 with passages to the crankcase and control housing.

*Description*

Figure 1:
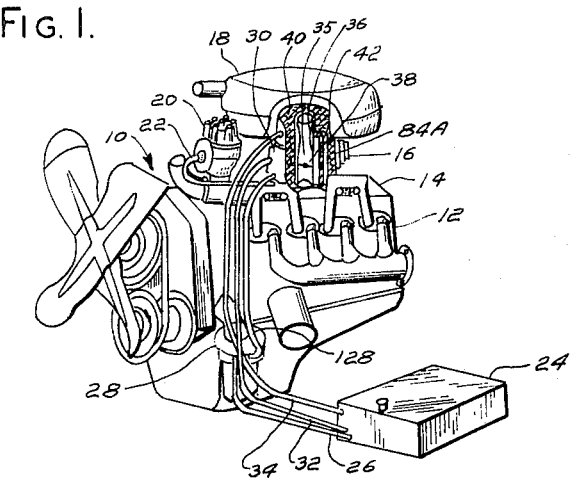
FIG. 1 is a perspective view partially in section and partially diagrammatic representing the invention as adapted to a preferred internal combustion engine.
Figure 11:
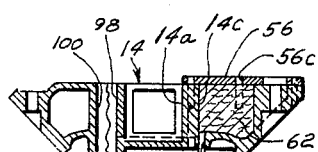
FIG. 11 is a cross sectional view of the air induction manifold of the present engine taken substantially on the line 11—11 of FIG. 2.

In FIG. 1 the present invention is shown as adapted to a V-type engine 10 having a cylinder block with a crankcase 12, on top of which is mounted a specially constructed air manifold assembly 14.

A pressure carburetor 16 is carried on the manifold 14 and in turn carries a conventional air cleaner 18. The engine incorporates a conventional ignition system utilizing a distributor 20 having a conventional spark-advance line 22 to the manifold 12. Fuel to the engine is drawn from a preferably pressure-sealed fuel tank 24 through a fuel line 26 by a conventional diaphragm-type fuel pump 28 and delivered to a fuel pressure regulator 30. Bleed fuel is returned to the tank 24 through a line 32, and the tank 24 is connected to the fresh air intake of the carburetor 16 by a line 34.

Air from the air cleaner 18 enters the manifold 14 through a carburetor intake duct 35 having a venturi 36, downstream of which is a throttle valve 38. Fresh filtered air also is drawn through an air duct 40 into the crankcase 12, from which air and entrained fumes are drawn through another duct 42 into the venturi 36.

Figure 2:
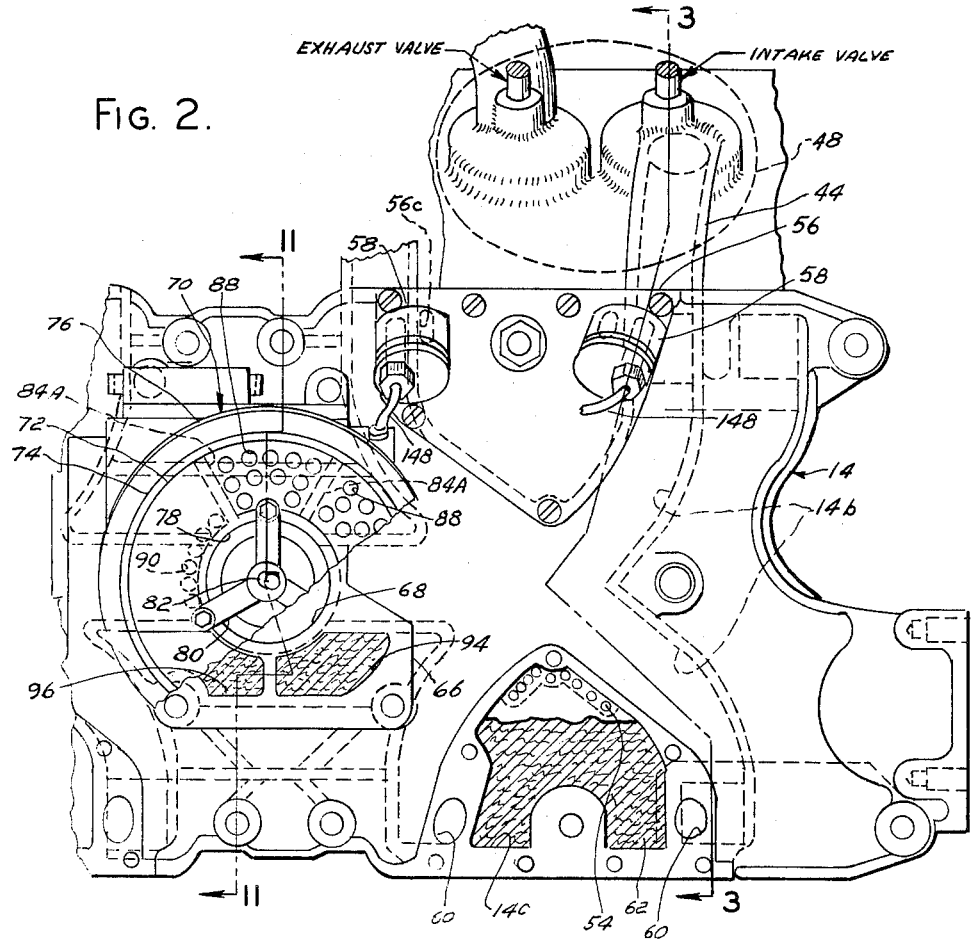
FIG. 2 is a fragmentary top view of the engine of FIG. 1 with some parts removed for clarity.

FIGS. 2 and 3 show the air manifold assembly 14 having a central chamber 14a directly beneath the carburetor intake duct 35, distributing throttled air through manifold ducts 14b to intake port runners 44 connected to the cylinder heads 46 of the engine 10, the air entering combustion chambers 48 through valve ports 50 controlled by conventional intake valves 52.

The manifold assembly 14 has chambers 14c open to the crankcase through drilled passages 54. The chambers 14c are each covered by a plate 56 which carries a pair of fuel nozzles 58. Each nozzle 58 is supplied with air and fumes from the crankcase 12 through chamber 14c, delivering same with fuel into the port runners 44 through clearance holes 60. The nozzle 58 is shown in FIG. 8 as comprising a two-part housing 58c having a discharge port 58b. A fuel discharge jet 58c is carried by the housing 58a for ejecting fuel across an air space through the port 58b. A port 58d is provided in a lateral portion of the housing 58a and is open to the chamber 14c through a port 56c in the plate 56 such that manifold vacuum will draw air and fumes through the nozzle between the jet 58c and port 58b, particularly during low speed operation when mass air flow through the carburetor 16 is lessened.

The chamber 14c is filled with a filter element 62 preferably made of flame arresting material. For ease of maintenance as well as manufacturing expediency, it will be noted that each plate 56 is constructed to provide mounting for a pair of fuel nozzles 58 which may be removed separately or together with the plate 56 when the filter 62 needs cleaning or replacement.

The carburetor 16 is illustrated in FIGS. 2-6 as comprising a housing 64 integral with a mounting flange 66 provided for mounting on top of the manifold 14. The mounting flange 66 has a central hole 68 registering with the lower end of the intake duct 35 and open into the manifold central chamber 14a. A cap assembly 70 is mounted on top of the carburetor and comprises a doughnut-shaped shell 72 on top of a mounting ring 74 provided with a tilted flange 76. The shell 72 has a central aperture 78 under a spider 80 carrying a tilted stud 82 for securing the air cleaner 18 to rest on the flange 76.

The mounting ring 74 has a convexly curved inner edge which forms the throat of the air intake venturi 36.

The shell 72 is interiorly divided into fresh air intake chambers 84 and 84A and a crankcase evacuation chamber 86. Inlet holes 88 provided in the top of the shell 72 are open to the chamber 84, admitting fresh filtered air thereto from within the air cleaner 18. Holes 90 provided in the ring 74 communicate the chamber 86 with an annular gap 92 under the throat of the venturi 36 in an area which will be at low pressure during engine operation particularly at high speeds.

The carburetor housing 64 has the previously noted vertical through passages 40 and 42 communicating the chambers 84 and 86 respectively with the interior of the crankcase 12 through registering holes 94 and 96 in the carburetor mounting flange 66 and passages 98 and 100 in the manifold assembly 14.

The passages 40 and 42 are preferably filled with flame-arresting filters 102. It will be apparent that the higher the mass air-flow through the venturi 36, such as at high engine speeds, the more fresh air will be drawn into the crankcase from the chamber 40, the air and crankcase fumes being drawn out of the crankcase through the chamber 42, to pass into the air induction system of the engine. If crankcase pressure should under any circumstance expel fumes out through the chamber 40, the fumes would merely be drawn into the air intake upstream of the venturi 36 since the fresh air connection to chamber 40 is intermediate the air cleaner 18 and the venturi 36.

The carburetor housing carries a fuel metering and distributing assembly 104 which extends into a control chamber 106 at one end and is secured to the fuel pressure regulator 30 at the other end.

The assembly 104 is mounted on the carburetor housing 64 by any means such as screws 108 and the regulator 30 is mounted on the assembly 104 by any means such as screws 110, as seen in FIG. 3.

The fuel pressure regulator 30 comprises a two-part housing 112 having a fuel chamber 114 with screen 155 and a control chamber 116 separated by a diaphragm assembly 118 into air and fuel portions 116A and 116B, the diaphragm assembly 118 being urged by a spring 120 toward the chamber 114. The diaphragm assembly 118 carries a valve plunger 122 having a needle valve 124 axially movable in a fuel port 126 which is open to an inlet port 128 adapted for connection with a fuel supply line 128 from the fuel supply pump 28 shown in FIG. 1.

The control chamber portion 116B is connected with the fuel chamber 114 by means of a vapor eliminator passage 130 and an orifice 132. The control chamber portion 116A is connected by a conduit 134 with a passage 136 in the carburetor housing 64, the passage 136 being connected as shown in FIG. 5 with the throat of the venturi 36.

The control chamber portion 116B is also connected, via passage 138 with the conduit 32 to the fuel tank 24 shown in FIG. 1. The fuel tank is also vented, via conduit 34 and a passage 140 in the carburetor housing 64, to a ram air pickup 141 air intake of the carburetor upstream of the venturi 36. The orifice 132 is very small relative to the size of the passage 138 and conduit 32 so that the diaphragm 118 has ram air pressure communicated to it on the chamber 116B side.

It will be apparent that the diaphragm assembly 118 moves in response to changes in mass air flow, since the chamber portion 116A senses venturi vacuum and the chamber portion 116B senses fuel tank pressure which is vented to the ram air intake. As it moves, the needle valve 124 varies the fuel entry into the chamber 114, consequently regulating fuel pressure therein.

As seen in FIG. 5, the fuel metering and distributing assembly 104 comprises a housing 142 having a bore 144 to which are open a plurality of distribution passages 146 adapted for connection to discharge lines 148 leading to the fuel delivery nozzles 58.

A metering valve member 150 is axially slidable in the bore 144 and has an axial passage 152 open to the fuel chamber 114 of the pressure regulator 30 and connected by ports 154 to an annular groove 156. A plurality of annularly spaced and longitudinally sloped grooves 158 register with each of the passages 146 such that axial movement of the valve member 150 will vary the amount of fuel delivered to the fuel nozzle 58.

Position of the valve member 150 is varied by the motion of a diaphragm assembly 160 forming one wall of the control chamber 106. Movement is transmitted preferably through a third class lever 162 pivotally connected to the diaphragm assembly 160 by a pin 164 and to the valve member 150 by a link 166 and pins 168, and is fulcrummed on a pin 170, as shown in FIGS. 5 and 6.

The outer side of the diaphragm assembly 160 is connected by a passage 172 to the air intake duct 35 downstream of the throttle valve 38. Springs 174 urge the diaphragm assembly toward the chamber 106, which is connected by ports 176 and 176A shown in FIGS. 4 and 6 to the fresh air intake chamber 84A in the shell 72.

The metering valve 150 is thus adjusted in response to variations of manifold pressure in the air induction system. As manifold pressure decreases, the diaphragm assembly 160 will be moved against the springs 174 to actuate the valve 150 to a position in which the sloped grooves 158 restrict fuel discharge to the nozzles 58. Increase of manifold pressure reverses this actuation to increase fuel discharge.

The fulcrum pin 170 is carried as shown in FIGS. 6 and 7 on a slide element 178 slidably mounted in a rotatable member 180 on a pair of screws 182. Adjusting the screws 182 operates to move the pin parallel to the direction of diaphragm assembly 160 operation, thus altering the position of the valve member 150, i.e., effecting fuel curve position adjustment. Rotation of the member 180 operates to move the pin 170 to different lateral distances from the pin 164, producing a variation in degree of valve member 150 actuation by the diaphragm assembly 160, i.e., effecting fuel curve length adjustment.

Air for engine idling operation (throttle 38 closed) is provided by passages 179 and 181 connecting the air intake 35 downstream of the throttle valve 38 with fresh air from the control chamber 106, the passage 179 being adjusted by a needle valve adjusting screw 185, all as seen in FIG. 6. Sufficient air is available through the passage 179 to compensate at idling, for the fumes drawn into the manifold through the nozzles, so that ample air for idling is at all times available.

Summarizing the foregoing, it is seen that movement of the diaphragm 118 (FIG. 4) in the pressure regulator 30 is effected by evacuation of chamber 116A response to the mass of air drawn through the throat of the venturi 36. As air is evacuated from the chamber 116A, pressure in the chamber 116B moves the diaphragm 118 against the spring 120.

Due to the fact that the fuel chamber 114 must be vented to permit escape of vapor and thus maintain a bubble free supply of fuel for metering, it simplifies the design to vent the chamber 114 into the chamber 116B and from there return the vented fuel to the fuel tank 24. This is further advantageous for, through the same line 32 that return fuel and vapor to the tank 24, the chamber 116B is maintained at the pressure which exists in the tank 24. The tank 24 is preferably sealed at the filler cap and tank venting is provided through the line 34 leading to the fresh air intake of the carburetor 16. This prevents fuel vapor leakage to atmosphere without the hazard of pressure buildup within the tank.

The sole object of diaphragm 118 movement, under the influence of mass air flow, is to move the valve needle 124 in relation to the valve seat 126A at the open side of the passage 126. The valve needle 124 is preferably of straight-sided design and the valve seat 126a has tapered or contoured walls, being adjustable by means of a screw head 127. The object of using a needle valve with straight sides, with a valve seat that is tapered or contoured, is that the fuel curve, derived from metering a constant pressure fuel supply, will begin its rise with a minimum inclination and increase its inclination as the needle is moved away from the seat. This shape of fuel curve is best, in conjunction with other assemblies in the system, in meeting the fuel requirements of the engine.

For all engines, the initial adjustment of the valve seat 126A will be to admit only fuel for engine idling at little or no fuel pressure. This initial control of fuel pressure is possible as the use of fuel from the chamber 114, augmented by the loss of fuel through the bleed orifice 132 from the chamber, need only be held equal by new fuel metered into the chamber. Equal entry and discharge will maintain the fuel pressure in the chamber 114 at zero. From this zero pressure setting, as the air throttle 38 is opened, the slight flow of air through the venturi 36 will start evacuation to move the diaphragm 118 against its spring 120, set at its free length, to start movement of the valve 124 away from the valve seat 126A. As the opening of the air throttle and the movement of the fuel valve away from the valve seat continues, the diameter of the straight-sided needle and the taper or contour of the valve seat must be so proportioned as to supply: A—the fuel to bleed the vent and return to the tank; B—the fuel to run the engine at the fractional load and speed; and C—a slight excess of fuel at each throttle setting to increase the pressure on the fuel in the chamber 114. As the engine requires maximum fuel at peak load and speed, the air induction and venturi suction are also at their maximum under these conditions. Under any fixed throttle setting, should the speed be reduced with load, the mass of inducted air is likewise reduced which reduces the venturi vacuum which causes the valve 124 to move towards its closed position which reduces the pressure on the fuel in the chamber 114. The movement of the metering valve, which varies the pressure on the fuel, is from zero or a low value to the maximum as provided by the fuel supply pump 28. With the conventional fuel supply pump this may be equivalent to the square root of 4 p.s.i. made available if demanded by the mass air flow of the engine.

Backing up the fuel supply pump, plus the fuel metering and pressure regulating assembly which receives its signals from the mass air-flow of the engine, there is also the multi-outlet, variable-orifice, fuel metering and distributing assembly 104 which distributes fuel to the fuel nozzles 58 at each intake port of the engine. This includes the positive fuel distributing valve 150 in which axial movement is assumed by a diaphragm 160 which is signalled by the density in the intake manifold. The movement of the diaphragm 160 is against the springs 174 which have their seats designed for positive alignment at free length. The movement of the diaphragm 160 against the springs 174 is utilized through an adjustable third class lever 162. This third class lever, with adjustments at one end for position or length of travel at the free end, has the free end link-coupled to the end of the multi-outlet fuel distributing valve 150. In this valve, which is fitted to diesel pump-plunger tolerances into the valve body 142, the variable-area distributing grooves are simultaneously coined and the valve centerless ground and honed after hardening. Both design and development has gone into the quantity production of these valves, as well as into precision boring and honing of valve bodies, with a suggested fixture, for coining distributing grooves, shown in FIGS. 9 and 10, as will be described.

One of the features of the fuel distributing valve 150 is that the idling position of the valve is determined by the manifold vacuum which holds the diaphragm against the force of the springs 174. While in this position, if the air throttle 38 is suddenly opened, the springs 174 instantly move the valve 150 to full-open position to distribute ample fuel to burn with the inrush of air. Conversely, with the distributing valve 150 held in normal idling position, if the manifold vacuum is increased, as by the vehicle descending a hill and driving the engine to augment the brakes, the valve 150 is moved by the vacuum to a point where the distributing grooves 158 end. Under this condition, air still bleeds into the intake manifold but the ends of the grooves are out of registry and fuel cannot be fed to the engine. When the pressure rises, fuel is again distributed and the engine begins firing.

Again referring to FIGS. 2 and 5, from each of the outlets 146 to the fuel distributing valve body 142, tubes 148 lead to the air sealed fuel nozzles 58 mounted on the intake manifold 14. Each fuel nozzle, which is so mounted that it sprays fuel into its individual intake port runner 44, is "air sealed," as the air, together with fumes from the crankcase 12, seals the vacuum of the intake manifold from the fuel in the carefully positioned integral fuel nozzles 58. This is accomplished as the air is drawn through the orifice 58b (FIG. 8), to satisfy the intake manifold vacuum and thus keep it from exerting a suction on the fuel jet 58c. By this means the fuel lines 148, from the distributing valve body 142, are kept solidly filled with fuel to the tip of the fuel jet 58c. Closely below the tip of the fuel jet 58c the air rushing through the orifice 58b surrounds the stream of fuel as it is discharged and literally pulverizes it, the degree of pulverization depending upon the pressure differential or manifold vacuum which exists at that instant.

In the invention the fuel nozzle 58, with its inherent air sealed feature, has been utilized as a prime element of crankcase ventilation. The nozzle 58 continues to serve in a normal capacity excepting that air, which seals the fuel nozzle from manifold vacuum, becomes a carrier for crankcase fumes. Additional air, to offset for the volume of the fumes carried through the nozzles, can easily be introduced into the manifold through the idle air adjustment 185 (FIG. 6). To reduce the possibility of residues or gums, from blowby or other fumes, building up and eventually interfering with normal fuel jet operation, large volumes of filtering and flame arresting material are provided between crankcase and nozzles with easy access provided for inspection or servicing. By utilizing the air sealed nozzles, of which there is one at each intake port of the engine, to exhaust crankcase fumes while idling, the exhausting of fumes also continues into the low part throttle range of operation.

Continuing from idling, as the throttle valve 38 is opened to increase the engine load and speed, the air inducted through the fuel nozzles decreases, but an increase of air, laden with fumes, is drawn from the crankcase through a special passage 42 (FIG. 4) which parallels the air intake passage 35 of the carburetor 30. This passage leads to a slot 92, just below the throat of the venturi 36, through which the air and fumes are drawn as air is inducted through the venturi 36 into the engine. Thus, as air suction and fume removal decreases through the air sealed nozzles, the aspiration of air and fumes through the wall of the venturi 36 increases. The fuel injector and the venturi aspirations overlap to provide continuous crankcase ventilation throughout the range of engine operation. The air from the crankcase, which serves an an eradicator for crankcase fumes, is drawn through a filtering and flame arresting material, such as shredded polyurethane or equivalent. This material also augments the oil separators which guard the entrances of the filter and flame arrester chambers which have been provided.

With the proposed crankcase ventilating system, the fresh air to the crankcase is continually supplied through a second passage 40 (FIG. 4) which parallels the other passage 42 and the air intake 36. This passage 40, plus another passage 84A to the control chamber 106 (FIG. 5), all have their entrance within the air cleaner of the engine. With the proposed system, a standard air cleaner 18 is used for which an angled air cleaner flange 76 is provided. This makes it possible to have a horizontal mounting of the air cleaner on a sloping mounting of the engine. The fueling system is insensitive to attitude, so it may slope. One feature of inside of air cleaner entry of air to both the engine and to the one passage which leads through the flame arrester directly to the crankcase is that if the engine is badly worn and the blowby is enormous, some of the blowby may escape from the crankcase through the fresh air inlet 40 only to be inducted into the engine again through the air intake 35 without escaping to contaminate the atmosphere.

It will be apparent that the valve member 150 is a critical part of the present invention, and it is essential, for uniformity of fuel discharge to the nozzles 58, that all of the sloped grooves 158 be the same. In FIGS. 9 and 10 I have illustrated a rapid production fixture 184 for forming such multiple grooves as comprising a base support structure 186 carrying a guide member 188 and a feeder assembly 190, secured by any means such as screws 192. A plurality of equally annularly spaced cylinder assemblies 194 are carried in recesses 196 on the periphery of the support structure 186, and retained by an annular manifold assembly 198 secured with screws 200 or the like.

The feeder assembly 190 comprises a vertical hopper 202 holding stacked valve blanks 150 with end tongues 150A aligned. A ram member 204 at the bottom of the hopper is adapted by means of a pin 206 extending through a slot 208 to be actuated by any motor means (not shown) to reciprocate and inject successive valve blanks 150 into a retaining bore 210 in the guide member 188.

The forward end of the valve blank 150 is stopped against a plate 212 adapted by means of a pin 214, extending through a slot 216 in a retaining plate 218, to be reciprocated in timed relation to the ram 204, opening upon completion of each valve blank to permit the next blank to eject the finished one.

Each cylinder 194 carries a reciprocable stepped piston 220 having on its inner end a knife or coining blade 222 secured in a slot 224 by any means such as a pin 226 and guided in a radial slot 227 in the guide member 188. On inward movement of the knife blades 222 they will cut or coin the grooves in the valve blank 150.

Since the depth of the grooves is critical, a stop member 228 carried by the blade itself is arranged to limit inward coining movement by abutting the valve blank 150. Thus all variations in pressure operating the pistons 220 and/or in feeding will have no effect on the actual coining and the grooves can be made completely uniform without difficulty.

The pistons 220 are conventional double-acting type, preferably hydraulically actuated by fluid directed thereto through ports 229 from a pair of annular grooves 230 in the manifold assembly 198.

Although I have described only one preferred embodiment of my invention, it will be apparent to one skilled in the art to which the invention pertains that various changes and modifications therein can be made without departing from the spirit of the invention or the scope of the appended claims.

I claim:

1. In an internal combustion engine having a crankcase, combustion chambers, manifold structure and throttle housing structure, said structures including air induction means and fuel delivery means delivering fuel-air mixture to said combustion chambers, a crankcase fume elimination system comprising
   (a) means supplying filtered air to said crankcase, and
   (b) said crankcase and said structures having internal passages discharging air and fumes from the crankcase into said air induction system.

2. The system as defined in claim 1 and including filtering means in said internal passages intermediate said crankcase and said air induction system.

3. The system as defined in claim 1 and including flame arrester means in said internal passages intermediate said crankcase and said air induction system.

4. The system as defined in claim 1 and in which said air induction system includes suction producing means and in which said internal passages openly communicate said crankcase with said suction producing means.

5. The system as defined in claim 1 and including means inspirating said air and fumes from said internal passages into said fuel delivery means.

6. An internal combustion engine comprising
   (a) a crankcase,
   (b) manifold structure and throttle housing structure forming an air induction system including an air intake venturi,
   (c) means conducting air into said crankcase, and
   (d) said crankcase and said structures having internal passages conducting air and fumes from said crankcase into said air induction system adjacent the low pressure area of said venturi.

7. An internal combustion engine comprising
   (a) a crankcase,
   (b) an air induction system including an air intake venturi,
   (c) means conducting air into said crankcase,
   (d) means conducting air and fumes from said crankcase into said air induction system adjacent the low pressure area of said venturi,
   (e) a fuel system including a fuel nozzle ejecting fuel into said air induction system downstream of said venturi, and
   (f) means conducting air and fumes from said crankcase to said air induction system through said nozzle to neutralize the effect of vacuum on said nozzle at predetermined speeds of engine operation.

8. An internal combustion engine comprising
   (a) a crankcase,
   (b) a manifold structure and a throttle housing structure forming an air induction system,
   (c) means conducting air into said crankcase,
   (d) a fuel system including fuel nozzle means ejecting fuel into said air induction system, and
   (e) said crankcase and said structures having internal passages conducting air and fumes from said crankcase to said means ejecting fuel for removal of said air and fumes thereby.

9. In an internal combustion engine
   (a) a crankcase structure,
   (b) an air induction system comprising a throttle housing structure having a throttle valve, an air cleaner upstream thereof, a manifold structure disposed intermediate said throttle housing structure and said crankcase structure and
   (c) crankcase breather means comprising passages passing through said structures and conducting air to said crankcase from said induction system intermediate said throttle valve and said air cleaner.

10. In an internal combustion engine
    (a) a crankcase,
    (b) an air induction system having a throttle valve and an air cleaner upstream thereof, and
    (c) crankcase breather means comprising passages internally of said engine conducting air into said crankcase and other passages internally of said engine conducting air and fumes from said crankcase into said air induction system intermediate said throttle valve and said air cleaner.

11. The engine as defined in claim 10 and in which said last mentioned passages have therein a filter for removal of crankcase originated residue in said fumes.

12. The engine as defined in claim 11 and in which said filter comprises a flame arresting material.

13. A mechanically distributed fuel carburetion system for an internal combustion engine having a plurality of combustion chamber intake ports, comprising
    (a) an air induction means having an air throttle valve and an intake manifold downstream thereof supplying air to each intake port,
    (b) fuel nozzles for discharging fuel into said air induction means at each intake port,
    (c) a fuel metering valve having a fuel inlet and a plurality of fuel outlets respectively connected with and variably distributing fuel to each individual nozzle,
    (d) means variably controlling the position of said metering valve in response to variations in intake manifold air density, and
    (e) means regulating fuel pressure on the upstream side of said metering valve fuel inlet relative to mass air flow in said air induction means and being operatively independent of said means controlling the position of said metering valve.

14. In an internal combustion engine having individual cylinders and an air intake valve for each cylinder,
    (a) an air induction means having an air throttle valve and an intake manifold downstream thereof including separate port runners supplying air individually to said intake valves,
    (b) a structurally unitary valve means having a fuel inlet and a plurality of fuel outlets respectively connected with and variably metering and distributing fuel into each individual port runner,
    (c) means variably controlling the operation of said unitary valve means in response to variations in manifold air density, and
    (d) means regulating fuel pressure to said unitary valve means relative to mass air flow in said induction means and being operatively independent of said means controlling the operation of said unitary valve means.

15. The engine as defined in claim 14 and in which said regulator means comprises
    (a) a housing having a fuel chamber and a control chamber provided with a pressure sensitive element
    (b) means openly communicating said fuel chamber with the inlet of said unitary valve means,
    (c) an inlet valve to said fuel chamber and operably connected with said pressure sensitive element,
    (d) a venturi means in said air induction means and means communicating suction pressure of said pressure sensitive element from said venturi means, and
    (e) said pressure sensitive element being operable to open said inlet valve in response to decreasing suction pressure produced by increasing mass air flow.

16. The engine as defined in claim 15 and including means sensing ram air pressure in said air induction means and communicating said ram air pressure to said pressure sensitive element for supplementing mass air flow sensitivity of said pressure sensitive element.

17. An internal combustion engine comprising
    (a) a crankcase,
    (b) an air induction system,
    (c) means conducting air into said crankcase,
    (d) a fuel system including fuel nozzle means ejecting fuel into said air induction system, and
    (e) means conducting air and fumes from said crankcase to said means ejecting fuel for removal of said air and fumes thereby,
    (f) said nozzle has a fuel discharge jet and a discharge port spaced from said jet, and
    (g) said means conducting air and fumes from said crankcase having means introducting said air and fumes intermediate said jet and said port in volume effective to neutralize vacuum in said air induction system adjacent said port at predetermined engine operating ranges.

18. In an internal combustion engine having a crankcase, combustion chambers, and air induction means and fuel delivery means delivering fuel-air mixture to said combustion chambers, a crankcase fume elimination system comprising
    (a) means supplying filtered air to said crankcase,
    (b) means discharging air and fumes from the crankcase into said air induction system,
    (c) said discharging means comprising means inspirating said air and fumes from said crankcase through said fuel delivery means,
    (d) said air induction means having a throttle valve, and
    (e) adjustable means supplying air to said induction means downstream of said throttle valve during idling operation in volume sufficient to compensate for air displacement by said crankcase fumes inspirated through said fuel delivery means.

19. A fuel metering and distributing valve assembly for an internal combustion engine having separate fuel nozzles for discharging fuel into separate combustion chamber air intakes, said valve assembly comprising
    (a) a housing having a longitudinal bore, a fuel inlet, and a plurality of annularly spaced fuel outlets communicating with said bore,
    (b) an axially movable valve element in said bore and provided with a plurality of axially extending grooves registering with said fuel outlets.
    (c) said grooves decreasing in cross-sectional area from one end to the other,
    (d) said valve element having an inlet communicating said housing inlet with said grooves, and
    (e) means adapted for connection to a pressure responsive actuator for axially adjusting said valve element to vary fuel delivery from said inlet simultaneously to said outlets.

20. The valve assembly as defined in claim 19 and in which said valve element inlet comprises a longitudinal bore in said valve element and radial ports connecting said bore with the larger ends of said grooves.

21. In an internal combustion engine having a crankcase, combustion chambers, and air induction means and fuel delivery means delivering fuel-air mixture to said combustion chambers, a crankcase fume elimination system comprising
   (a) means supplying filtered air to said crankcase, and
   (b) means discharging air and fumes from the crankcase into said air induction system,
   (c) said discharging means comprising
      (1) means inspirating said air and fumes from said crankcase into said air induction means when same is producing high mass air flow, and
      (2) means producing flow of said air and fumes from said crankcase through said fuel delivery means when said air induction means is producing mass air flow insufficient to effectively aspirate said air and fumes into said air induction means.

References Cited by the Examiner
UNITED STATES PATENTS

| | | | |
|---|---|---|---|
| 1,912,235 | 5/1933 | Winslow | 123—119 |
| 2,191,940 | 2/1940 | Meckel | 123—119 |
| 2,281,124 | 4/1942 | Westcott | 123—119 |
| 2,378,036 | 6/1945 | Reggio | 123—140.31 |
| 2,447,261 | 8/1948 | Mock | 123—119 |
| 2,448,131 | 8/1948 | Williams | 123—119 |
| 2,511,213 | 6/1950 | Leslie | 123—119 |
| 2,737,935 | 3/1956 | Olson | 123—119 |
| 2,893,365 | 7/1959 | Raefner | 123—119 |
| 2,906,252 | 9/1959 | Beardsley | 123—119 |
| 2,930,368 | 3/1960 | Mick | 123—119 |
| 2,932,197 | 4/1960 | Appel | 78—21 |
| 2,986,051 | 5/1960 | Appel | 78—21 |
| 3,030,942 | 4/1962 | Thompson | 123—119 |

KARL J. ALBRECHT, *Primary Examiner.*